US009852568B2

(12) United States Patent
Su et al.

(10) Patent No.: US 9,852,568 B2
(45) Date of Patent: Dec. 26, 2017

(54) APPARATUS AND METHOD FOR CHECKING VALUE DOCUMENTS, IN PARTICULAR BANK NOTES, AND VALUE-DOCUMENT PROCESSING SYSTEM

(71) Applicant: GIESECKE & DEVRIENT GMBH, Munich (DE)

(72) Inventors: Shanchuan Su, Neubiberg (DE); Steffen Schmalz, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 77 days.

(21) Appl. No.: 14/784,883

(22) PCT Filed: Apr. 17, 2014

(86) PCT No.: PCT/EP2014/001055
§ 371 (c)(1),
(2) Date: Oct. 15, 2015

(87) PCT Pub. No.: WO2014/173522
PCT Pub. Date: Oct. 30, 2014

(65) Prior Publication Data

US 2016/0063791 A1 Mar. 3, 2016

(30) Foreign Application Priority Data

Apr. 22, 2013 (DE) ........................ 10 2013 006 925

(51) Int. Cl.
*G06K 9/74* (2006.01)
*G07D 7/18* (2006.01)
(Continued)

(52) U.S. Cl.
CPC ................ *G07D 7/18* (2013.01); *G07D 7/06* (2013.01); *G07D 7/181* (2017.05); *G07D 7/187* (2013.01); *G07D 7/20* (2013.01)

(58) Field of Classification Search
CPC .. G07D 7/18; G07D 7/06; G07D 7/00; G07D 7/0006; G07D 7/12; G06K 9/186;
(Continued)

(56) References Cited

U.S. PATENT DOCUMENTS 8,917,386 B2 12/2014 Holl et al.
8,976,420 B2 3/2015 Steidl
(Continued)

FOREIGN PATENT DOCUMENTS

DE 10227354 A1 1/2004
DE 102005009332 A1 9/2006
(Continued)

OTHER PUBLICATIONS

German Search Report for corresponding German Application No. 102013006925.4, dated Oct. 28, 2013.
(Continued)

*Primary Examiner* — Jamil Ahmed
(74) *Attorney, Agent, or Firm* — Justin J. Cassell; Workman Nydegger

(57) ABSTRACT

An apparatus and method for checking value documents, in particular bank notes, and a value-document processing system having at least one sensor for capturing an electromagnetic radiation. Transmitted by a value document and generating corresponding first sensor signals and for capturing an electromagnetic radiation remitted by the value document and generating corresponding second sensor signals, and an evaluation device for checking whether the value document has a foreign object. In particular adhesive tape, taking into account the first and second sensor signals
(Continued)

which correspond to the electromagnetic radiation respectively transmitted or remitted in the region of the edge of the value document. The apparatus and method prevent a deformation in the region of the edge of a value document from being identified as a foreign object.

15 Claims, 3 Drawing Sheets

(51) Int. Cl.

| | |
|---|---|
| ***G07D 7/06*** | (2006.01) |
| ***G07D 7/187*** | (2016.01) |
| ***G07D 7/20*** | (2016.01) |
| ***G07D 7/181*** | (2016.01) |

(58) Field of Classification Search
CPC ...... G06K 9/00442; G06K 9/00; G01N 21/84; G06F 17/30598; G01J 1/42; G06Q 40/00
See application file for complete search history.

(56) References Cited

U.S. PATENT DOCUMENTS

| | | | | |
|---|---|---|---|---|
| 2003/0043365 | A1 | 3/2003 | Ross et al. | |
| 2010/0128965 | A1 | 5/2010 | Blair | |
| 2010/0329507 | A1* | 12/2010 | Manabe | G07D 7/122 382/100 |
| 2011/0199649 | A1 | 8/2011 | Steidl | |
| 2012/0176605 | A1 | 7/2012 | Stoeckli et al. | |
| 2013/0044935 | A1 | 2/2013 | Minin et al. | |
| 2013/0088712 | A1 | 4/2013 | Holl et al. | |

FOREIGN PATENT DOCUMENTS

| | | | |
|---|---|---|---|
| DE | 102006027068 | A1 | 1/2007 |
| DE | 102008051758 | A1 | 4/2010 |
| DE | 102009032227 | A1 | 1/2011 |
| DE | 102010021803 | A1 | 12/2011 |

OTHER PUBLICATIONS

International Preliminary Report on Patentability for corresponding International PCT Application No. PCT/EP2014/001055, dated Oct. 27, 2015.

International Search Report for corresponding International PCT Application No. PCT/EP2014/001055, dated Jul. 28, 2014.

* cited by examiner

APPARATUS AND METHOD FOR CHECKING VALUE DOCUMENTS, IN PARTICULAR BANK NOTES, AND VALUE-DOCUMENT PROCESSING SYSTEM

BACKGROUND

This invention concerns an apparatus and a method for checking value documents, in particular bank notes, and a value-document processing system.

In bank-note processing systems, properties of bank notes, such as printed image, denomination, authenticity and condition, are ascertained by capturing physical properties of the bank notes by means of sensors and evaluating the thereby generated sensor data.

Checking the condition, the so-called fitness, of a bank note involves checking whether it meets certain criteria to be able to be put back in circulation or have to be removed from circulation. Besides the degree of soiling and wear, an important criterion here is also the presence of unwanted foreign objects, usually in the form of adhesive tape or other stickers, on the bank note.

Checking the presence of adhesive tape is usually done by measuring the thickness of the bank note to be checked by means of mechanical or ultrasound thickness sensors.

From DE 10 2010 021 803 A1 it is further known to recognize adhesive tape by a dark-field transmission image of the bank note. This exploits the fact that adhesive tape extending beyond the edge of the bank note appears light in the transmission image, due to light scattering on the adhesive tape. When adhesive tape protrudes beyond the edge of the bank note, the value-document edge observed in transmission deviates from the usually straight edge course. Recognizing adhesive tape solely by the transmission image of the bank note is disadvantageous, however, since it can happen that distortions or deformations of the bank note, which can occur e.g. upon bank-note transport by machine and/or due to a cut edge not being completely straight, are falsely taken for adhesive tape, since with adhesive tape there is also observed a bank-note edge deviating from the straight edge course. A thus distorted or deformed bank note is then unnecessarily sorted out and possibly destroyed due to suspected adhesive tape, although it could have been put back in circulation.

SUMMARY

It is the object of the present invention to state an apparatus, a method and a value-document processing system that enable foreign objects, in particular adhesive tape or other stickers, on the bank note to be recognized as reliably as possible.

This object is achieved by the apparatus, the method and the value-document processing system according to the independent claims.

The apparatus according to the invention for checking value documents, in particular bank notes, has: at least one sensor for capturing an electromagnetic radiation transmitted by a value document and generating corresponding first sensor signals and for capturing an electromagnetic radiation remitted by the value document and generating corresponding second sensor signals, and an evaluation device for checking whether the value document has a foreign object, in particular adhesive tape, taking into account first and second sensor signals which correspond to the electromagnetic radiation respectively transmitted or remitted in the region of the edge of the value document.

The method according to the invention for checking value documents, in particular bank notes, has the following steps: capturing an electromagnetic radiation transmitted by a value document and generating corresponding first sensor signals, capturing an electromagnetic radiation remitted by the value document and generating corresponding second sensor signals, and checking whether the value document has a foreign object, in particular adhesive tape, taking into account first and second sensor signals which correspond to the electromagnetic radiation respectively transmitted or remitted in the region of the edge of the value document.

The value-document processing system according to the invention has at least one apparatus for processing, in particular conveying and/or counting and/or sorting, value documents, in particular bank notes, and is characterized by the apparatus according to the invention for checking value documents.

The invention is based on the idea of drawing on both the transmission properties and the remission properties in the region of the edge of the value document when checking whether a foreign object, in particular adhesive tape or another sticker, is present on the value document. In so doing, the presence of a foreign object is inferred on the basis of any differences between the edge course of the value document ascertained from the transmission image and its edge course ascertained from the remission image.

The approach according to the invention is particularly suitable for recognizing adhesive tape or other stickers located on value documents, which are stuck to the value document for example for repair purposes in order to remedy defects, in particular tears, usually occurring in the edge region of the value document. In particular, it makes it possible to recognize that adhesive tape that projects as far as the value document's cut edge or, where applicable, even slightly therebeyond.

As tests have shown, such adhesive objects are recognizable in the region of the edge of the recorded transmission image in the form of an elevated lightness relative to the background, whereas the remission image shows no changed lightness course in the corresponding edge region. This behavior can be explained by the fact that upon the capture of the transmission image, in particular a dark-field transmission image, the light impinging on the adhesive object is scattered beyond the value document's cut edge and is captured upon the transmission measurement. Alternatively or additionally to the scattering of the light, it is also possible that the impinging light is conducted from the adhesive object to the cut edge of the adhesive object and exits diffusely there, which as a result likewise has the consequence of light being emitted in the value document's corresponding edge region. In the remission image the adhesive object yields no elevated lightness, however, so that the actual edge of the respective bank note is observed there.

The approach according to the invention for recognizing foreign objects on the value document is particularly suited for objects that scatter, refract and/or conduct electromagnetic radiation in the visible and/or infrared and/or ultraviolet spectral region. There can be recognized both adhesive tape that appears clear and adhesive tape that appears matt and is nearly invisible on the bank note. However, this also holds in principle for adhesive tape that is substantially opaque in the visible spectral region, such as so-called insulating tape, which can scatter electromagnetic radiation in other spectral regions, in particular in the ultraviolet and/or infrared spectral region.

The particular advantage of the approach according to the invention, of taking into account not only the value document's transmission properties but also its remission properties along the edge for recognizing adhesive tape, lies in the course of the edge in the transmission image clearly differing from the course of the edge in the remission image in the region of adhesive tape located on the value document. In contrast, the courses in the transmission image and remission image are identical in the case of distortions or deformations occurring at the edge of the value document. Such distortions or deformations of the bank note can occur e.g. upon bank-note transport by machine and/or due to a cut edge that is not completely straight. If the deviations from the rectangular shape are not too great, bank notes with such distortions or bulges are not sorted out upon the condition check of the bank note.

Through the comparison of the two edge courses, bank notes having adhesive tape are reliably distinguished from those bank notes showing merely a deformation or bulge. This prevents the latter from being wrongly taken out of circulation and possibly fed to a destruction process.

The invention thus allows a reliable recognition of foreign objects, in particular adhesive tape or other stickers, on value documents.

Preferably, the at least one sensor is configured for spatially resolved capture of the electromagnetic radiation transmitted and remitted by the value document and for generating corresponding first and second sensor signals. This enables the spatial course of both the spatially resolved first sensor signal and the spatially resolved second sensor signal, said spatial course being obtained in the region of the edge of the value document, in particular along its edge, to be taken into account upon the check of whether the value document has adhesive tape, which makes it possible to distinguish value documents with and without adhesive tape especially reliably.

It is furthermore particularly preferred that the at least one sensor is configured for generating a transmission image, in particular a dark-field transmission image, composed of first sensor signals and a remission image composed of second sensor signals. With a dark-field transmission image, the transmission image of the value document stands out from a dark image background, with well resolved, high-contrast transmission images nevertheless being obtained even at low contrasts in the value document. The value document is for this purpose subjected to electromagnetic radiation such that direct rays pass by the sensor and only those reach the sensor that are deflected, in particular refracted and/or scattered, in the value document. A remission image is a spatially resolved recording of the electromagnetic radiation reflected diffusely or directionally by the value document. This embodiment also allows the spatial course of the first sensor signal and second sensor signal, said course being respectively obtained in the region of the edge of the value document, in particular along its edge, to be taken into account upon the check of the value document, in order to guarantee an especially reliable distinction of value documents with and without adhesive tape.

According to a further preferred embodiment of the invention, the evaluation device is configured such that, upon the check of whether the value document has a foreign object, in particular adhesive tape, it compares with each other those first and second sensor signals that correspond to the electromagnetic radiation respectively transmitted or remitted in the region of the edge of the value document. If this comparison shows that the first and second sensor signals obtained in the region of the edge of the value document, in particular along its edge, have substantially the same spatial course, it can be inferred that no adhesive tape is located on the value document. However, if the spatial course of the first sensor signals deviates from the spatial course of the second sensor signals in a portion along the edge of the value document, the presence of adhesive tape can be inferred. As a result of this, value documents with adhesive tape can be distinguished from those without adhesive tape reliably and in a simple manner.

In particular, the positions of the edge points which the transmission image yields are compared with the positions of the corresponding edge points which the remission image yields. And for adhesive tape recognition the distance between one edge point of the transmission image in each case and the edge point corresponding thereto in the remission image is determined and evaluated. Normally (without adhesive tape), the two edge courses that are observed in transmission and in remission are approximately congruent, i.e. the mutually corresponding remission edge points and transmission edge points respectively have a very small distance apart which lies below a pre-specified distance comparison value. In the case of adhesive tape, however, said edge courses are not congruent, but rather one ascertains an elevated distance which exceeds a pre-specified distance comparison value, e.g. over a plurality of neighboring edge point pairs. Since the geometrical distortions or bulges of the bank note are just as visible in the remission image as in the transmission image, there also results in the case of geometrical distortions or bulges of the bank note a very small distance between the remission edge points and the transmission edge points which lies below the distance comparison value. Geometrical distortions or bulges of adhesive tape can hence be distinguished through the invention. This prevents geometrical distortions or bulges of the bank note from being incorrectly taken for adhesive tape ("false tape"') and the relevant bank note from being unnecessarily sorted out.

In a particularly preferred embodiment of the invention, the evaluation device is configured for ascertaining on the basis of the first sensor signals one or more first edge points that correspond to points in the region of the edge of the value document and for ascertaining on the basis of the second sensor signals one or more second edge points that correspond to points in the region of the edge of the value document, and for comparing at least the position of one of the first edge points with the position of at least one of the second edge points. The first and the second edge point whose positions are compared with each other lie at the same place on the value-document edge, viewed along the value-document edge running around the value document. On the basis of the spatial distance between the first and second edge points it is checked whether a foreign object, in particular adhesive tape, is present in the region of the edge of the value document. Preferably, the position of the first edge point and the position of the second edge point corresponding thereto are respectively compared for a plurality of pairs of a first and a second edge point which are mutually neighboring edge point pairs along the edge of the value document. Adhesive tape can thus be recognized especially reliably. In particular, the positions of all first and second edge points obtained along the edge of the value document are compared with each other.

Preferably, the evaluation device is configured for ascertaining the first and/or second edge points by a comparison of the first or second sensor signals with at least one threshold value. Thus, the level of the first sensor signals is compared with a first threshold value for example in the transmission image, with sensor signals greater than the first threshold value being associated with the transmission image of the value document, whereas sensor signals smaller than the first threshold value are associated with the background surrounding the value document. On this basis an edge recognition can then be effected by means of edge detection algorithms, by which an edge course, composed of a multiplicity of first edge points, of the transmission image of the value document is ascertained. In the remission image the level of the second sensor signals is compared with a second threshold value; otherwise the remarks on the transmission image apply accordingly. The first and second edge points are ascertained especially exactly by means of threshold value comparison and edge detection, which further increases the reliability of the adhesive tape recognition.

It is further preferred that the evaluation device is configured for ascertaining at least one distance value which represents a measure of the spatial distance of one of the first edge points from one of the second edge points, and in particular comparing the at least one distance value with at least one pre-specified distance comparison value.

Furthermore, it is preferred that the at least one distance comparison value corresponds to a distance value ascertained in advance on the basis of at least one value document on which no foreign object, in particular no adhesive tape, is located. The distance comparison value can be identical for all four edges of the value document, but can also be determined separately for individual edges or each of the edges.

For example, the at least one distance value corresponds to the Euclidean distance between a first and a second edge point in each case. Alternatively, however, it is also possible to determine as a distance value for example only the difference of that coordinate, e.g. the x coordinate, of the first and second edge points that extends perpendicularly to the respective edge, i.e. along the y direction, of the value document.

Alternatively or additionally to determining the distance, one can also determine the size of an area, defined by the edge points, which the edge course obtained from the transmission image encloses with the edge course obtained from the remission image, e.g. by integration or by adding up the respective distance values, and check whether it exceeds a pre-specified area comparison value F. If the area comparison value is exceeded, the presence of a foreign object is affirmed, otherwise negated.

Additionally or alternatively, statements about the presence of adhesive tape on the value document can be derived on the basis of a statistical evaluation of the lightnesses, i.e. the levels of the first or second sensor signals, at the first or second edge points. Mean values and/or variance values of the lightnesses can e.g. be determined for this purpose.

Value documents with and without adhesive tape can be distinguished with especially high reliability by one or more of the hereinabove mentioned measures.

The respective first and second edge points from which a distance value is respectively ascertained are mutually corresponding points along the value-document edge, e.g. points with the same pixel number when one runs through the remission edge course and transmission edge course pixel-wise from the same value-document corner. If transmission image and remission image are shifted relatively to each other, they can be transformed into a common coordinate system such that the four corner points of the transmission image coincide with the four corner points of the remission image, whereby one of the corner points can serve as the coordinate origin. A transformation of the transmission or remission image can be effected by translating and/or rotating the respective coordinates. The presence of adhesive tape on the value document can be affirmed or ruled out especially reliably as a result of this.

For example, the distance value is respectively ascertained for a plurality of pairs of a first and a second edge point which are preferably mutually neighboring edge point pairs along the edge of the value document, and it is checked whether a pre-specified minimum number N of (neighboring) pairs of edge points exceeds the distance comparison value A. If the distance comparison value A is exceeded for at least a pre-specified minimum number N of (neighboring) pairs of edge points, the presence of foreign object, in particular adhesive tape, is affirmed and otherwise negated.

For example, the evaluation device is configured for ascertaining a number n of distance values greater than the distance comparison value, and in particular performing the check of whether the value document has a foreign object, in particular adhesive tape, on the basis of a comparison of the ascertained number n of distance values greater than the distance comparison value, with a pre-specified number N of distance values. By the pre-specified number N it can be specified in a simple manner in how many, preferably consecutive, edge points the edge course of the first and second sensor signals must differ in order to reliably infer the presence of adhesive tape.

For example, the minimum number amounts to $N>2$, preferably $N>4$. Additionally, an upper limit can be pre-specified for the number of edge point pairs exceeding the distance comparison value, said limit being chosen in dependence on the maximum width of the adhesive objects to be recognized, and the presence of adhesive tape only affirmed when the upper limit is also undershot. The distinction between value documents with and without adhesive tape thereby becomes even more reliable.

BRIEF DESCRIPTION OF THE DRAWINGS

Further advantages, features and possibilities of application of the present invention will result from the following description in connection with the figures. There are shown.

DETAILED DESCRIPTION OF VARIOUS EMBODIMENTS

Figure 1:
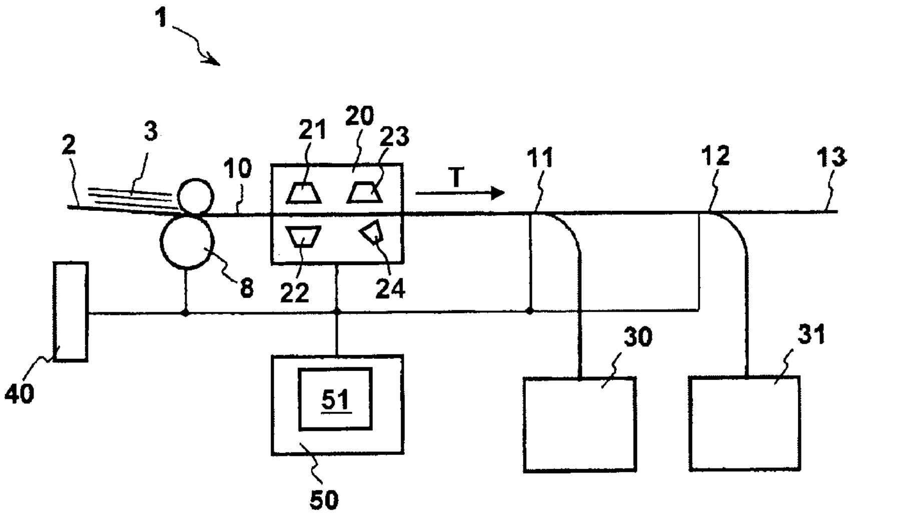
FIG. 1 an example of a schematic construction of a value-document processing system.

FIG. 1 shows an example of a schematic construction of a value-document processing system 1 having an input pocket 2 in which a stack of value documents, in particular bank notes 3, to be processed is supplied, and a singler 8 from which the respectively lowermost bank note of the inputted stack is grasped and delivered to a transport device 10—rendered only schematically in the chosen representation—which conveys the bank note to a sensor device 20 in transport direction T.

The sensor device 20 comprises in the represented example a first, second and third sensor 21, 22, 23 which is respectively preferably configured as a so-called line-scan camera and captures light emanating from the bank note by means of sensor elements arranged along a line, in particular in the visible and/or infrared and/or ultraviolet spectral region, and converts it into corresponding sensor signals.

In the represented example, the first and second sensors 21, 22 capture light remitted, i.e. diffusely and/or directionally reflected, by the front side or back side of the bank note and convert it into corresponding first sensor signals. The third sensor 23 located in the region of the front side of the bank note, however, captures the light transmitted through the bank note, said light being emitted by a light source 24, obliquely impinging on the bank note and passing through it, and converts it into corresponding second sensor signals. Due to the light from the light source 24 impinging on the bank note obliquely, the third sensor captures a so-called dark-field transmission image, in which the bank note appears light and its surroundings or background dark. The first and second sensors 21, 22 are also designated remission cameras, and the third sensor 23 is also designated a transmission camera.

Preferably, the line with the sensor elements of the respective sensor 21, 22, 23 extends substantially perpendicularly to the transport direction T of the bank notes, so that there is obtained upon each readout operation of the sensor line of the respective sensor 21, 22, 23 a sensor signal course, along the sensor line, which corresponds to an intensity course of the light that is transmitted or remitted by the bank note in a direction extending perpendicularly to the transport direction T.

The first and second sensor signals generated by the sensors 21 to 23 of the sensor device 20, in particular the corresponding first and second sensor signal courses, are relayed to a control device 50 as well as an evaluation device 51. The evaluation device 51 can be contained in the control device 50 or else form a unit separate from the control device 50.

In the evaluation device 51 the sensor signals, possibly after preprocessing, are drawn on for checking the bank note, with statements being derived from the respective sensor signals about different properties of the respective bank note, such as authenticity or condition of the bank note, in particular degree of soiling, wear, defects and the presence of foreign objects, such as adhesive tape and other stickers, but also paper clips and staples. Soiling, wear and defects can be recognized from the remission image and/or transmission image using known evaluation methods, and the presence of foreign objects using the evaluation according to the invention.

Depending on the properties of the respective bank note that are ascertained in the evaluation device 51, the transport device 10 as well as the gates 11 and 12 along the transport line are controlled by the control device 50 such that the bank note is fed to one of a plurality of output pockets 30 and 31 and deposited there. For example, bank notes in good condition, in particular having no foreign objects such as adhesive tape, are deposited in a first output pocket 30, while bank notes in poor condition, e.g. bank notes with adhesive tape, are deposited in a second output pocket 31. Suspect bank notes are deposited in a further pocket (not shown).

The reference number 13 at the end of the represented transport line in intended to indicate that further output pockets and/or other devices can be provided, for example for storing or destroying bank notes. If for example the check of a bank note shows that it does not meet certain condition criteria with regard to soiling, wear, defects or the presence of foreign objects, it can be fed directly to a shredder for destruction.

The value-document processing system 1 further comprises, in the represented example, an input/output device 40 for inputting of data and/or control commands by an operating person, for example by means of a keyboard or a touchscreen, and outputting or display of data and/or information about the processing operation, in particular about the respectively processed bank notes.

The value-document processing system 1 shown by way of example is especially suitable for checking value documents for the presence of foreign objects, such as adhesive tape and other stickers, which will be explained more closely hereinafter.

Figure 2:
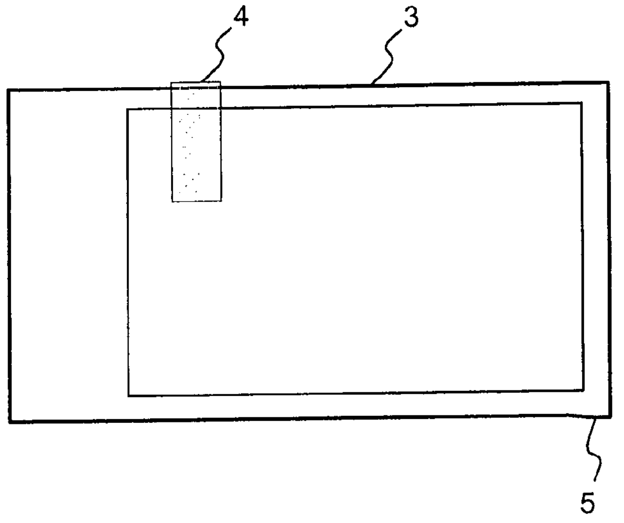
FIG. 2 an example of a value document in the form of a bank note.

FIG. 2 shows an example of a value document in the form of a bank note 3—represented only very schematically in the present case—bearing adhesive tape 4 which projects slightly beyond the edge of the bank note 3 in the represented example. For illustrative reasons, the adhesive tape 4 protrudes beyond the edge of the bank note 3 in a clearly visible manner. However, the following comments also apply accordingly to adhesive tape or other comparable foreign objects on the bank note 3 that are flush with the edge of the bank note 3.

The adhesive tape 4 can in principle be any kind of adhesive tape, such as adhesive tape that is transparent and/or clear and/or matt and/or light-transmissive only in the checked spectral region.

The represented bank note 3 has a deformation 5 in the region of its lower right corner, which has been represented in enlarged form in the present example again for illustrative reasons, and can have different causes, such as a cut edge of the bank note 3 that is imperfect for manufacturing reasons or a distortion caused by the transport of the bank note 3 in a bank-note processing system. In the represented example, the deformation 5 is represented as a projection relative to the rest of the course of the lower cut edge of the bank note 3. However, the following comments also apply accordingly to all other kinds of deviations of the outer shape of the bank note 3 from the conventional rectangular bank-note shape.

Figure 3:
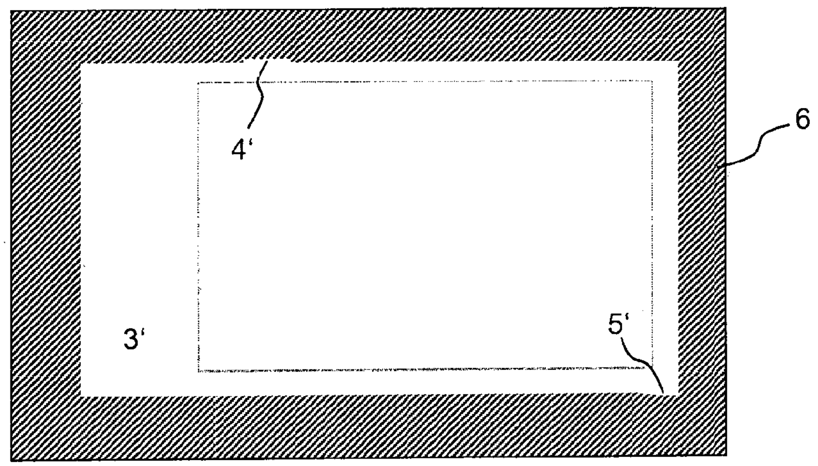
FIG. 3 an example of a transmission image of the bank note shown in FIG. 2.

FIG. 3 shows an example of a transmission image 3' of the bank note 3 shown in FIG. 2. The transmission image 3' represented here is preferably a so-called dark-field transmission image, which is obtained by light being emitted from the light source 24 (see FIG. 1), and impinging on the bank note 3, obliquely, i.e. at an angle clearly different from 90°, with regard to the area of the transmission camera 23. The light passing through the bank note 3 is captured by the transmission camera 23 and converted into corresponding first sensor signals which compositely yield the transmission image 3'. The light passing by the bank note 3 and passing by the transmission camera 23 leads to the transmission image 3' of the bank note 3 appearing against a substantially completely dark background 6 in the transmission recording shown here.

The transmission image 3' of the bank note 3 shows a region 4' having an elevated lightness relative to the dark background 6, which is due to the fact that the light impinging on the bank note 3 is scattered and/or refracted in the direction of the transmission camera 23 by the adhesive tape 4 and—unlike the illumination light passing by the transmission camera 23—is captured by the transmission camera 23. In the transmission image 3' of the bank note 3 there is further to be recognized a region 5' corresponding to the deformation 5.

Figure 4:
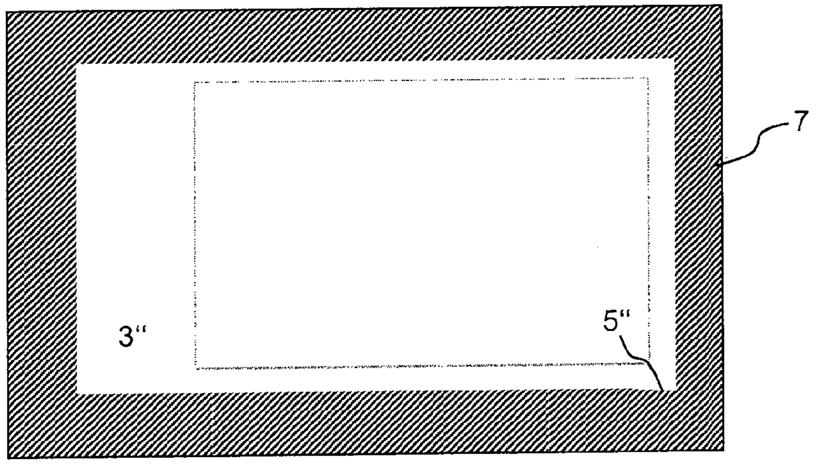
FIG. 4 an example of a remission image of the bank note shown in FIG. 2.

FIG. 4 shows an example of a remission image 3" of the bank note 3 shown in FIG. 2, which was recorded with one of the two remission cameras 21, 22 (see FIG. 1) by capturing the light remitted, i.e. directionally or diffusely reflected, by the bank note 3 and converting it into corresponding second sensor signals which compositely form the remission image 3". Due to the lack of reflection or scattering of the illumination light passing by the bank note 3, the remission image 3" of the bank note 3 also appears against a substantially dark background 7.

In the remission image 3" there is likewise to be recognized a region 5" corresponding to the deformation 5 of the bank note 3. However, unlike in the transmission image 3', at whose upper edge a light region 4' corresponding to the position of the adhesive tape 4 is to be recognized (see FIG. 3), no corresponding region occurs in the remission image 3". This can be explained by the fact that the adhesive tape 4 causes only little backscatter of the impinging light, so that the part of the adhesive tape 4 protruding beyond the edge of the bank note 3 cannot be distinguished from the substantially uniformly dark background 7 in the remission image 3".

After the recording of the transmission image 3' and of the remission image 3" of the bank note 3, the course of the edge of the respective image 3', 3" is ascertained both from the transmission image 3' and from the remission image 3", e.g. by comparing the first or second signal values containing signal values in the region of both the image 3', 3" and the background 6, 7 with a threshold value in each case. In so doing, sensor signals whose level exceeds the pre-specified threshold value are associated with the transmission image 3' or remission image 3", while sensor signals undershooting the pre-specified threshold value are associated with the background 6, 7.

Figure 5:
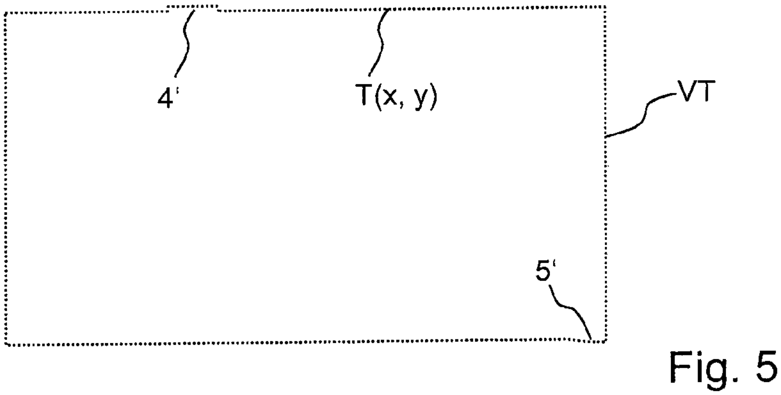
FIG. 5 an example of the course of the edge of the transmission image.
Figure 6:
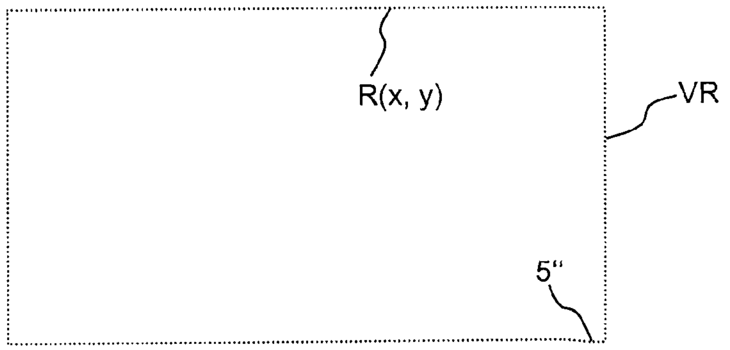
FIG. 6 an example of the course of the edge of the remission image.

Subsequently, an edge detection is carried out on the transmission recording and remission recording, by which a course VT, VR, composed of a multiplicity of edge points T(x, y), R(x, y), of the edge of the transmission image 3' or remission image 3" of the bank note 3 is respectively ascertained, said course being represented by way of example in FIGS. 5, 6.

As already explained in connection with FIGS. 3 and 4, the represented edge course VT of the transmission image 3' and the edge course VR of the remission image 3" show a region 5', 5" corresponding to the deformation 5 at the edge of the bank note 3, whereas a region 4' corresponding to the position of the adhesive tape 4 only occurs in the edge course VT of the transmission image 3'.

In a further step, the first and second edge points T(x, y), R(x, y) are transformed, in particular by rotation and/or translation, such that the four corners of the edge course VT of the transmission image 3' coincide with the four corners of the edge course VR of the remission image 3". The coordinates x and y of the edge points T(x, y) and R(x, y) then relate to a common coordinate origin which preferably—as shown in FIG. 7—coincides with one of the four corners of the edge courses VT and VR.

Figure 7:
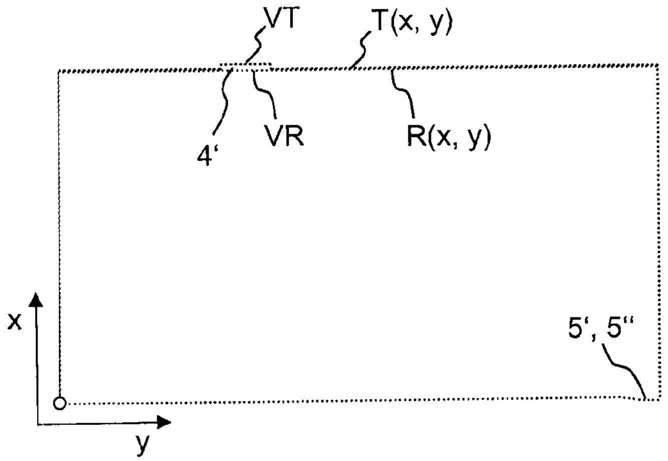
FIG. 7 a superimposition of the courses shown in FIGS. 5 and 6.

FIG. 7 shows that the edge courses VT and VR are mutually indistinguishable in the regions 5' and 5" corresponding to the deformation 5 of the bank note 3, whereas the first edge course VT of the transmission image deviates significantly from the second edge course VR of the remission image in the region 4' of the adhesive tape 4 on the bank note 3.

Starting out from the edge courses VT and VR brought almost entirely into coincidence, a distance value D is then respectively computed for one or more pairs of edge points T(x, y) of the transmission image and edge points R(x, y) of the remission image, said value representing a measure of the distance between the first edge points T(x, y) from the corresponding second edge points R(x, y). For example, there is computed as a distance value D the so-called Euclidean distance between the respective two points T(x, y) and R(x, y) as follows:

where $x_T$ and $y_T$ represent the coordinates of the first edge point T(x, y), and $x_R$ and $y_R$ the coordinates of the second edge point R(x, y).

In principle it is possible to compute one or more distance values D only in certain portions of the two edge courses VT, VR. However, it is preferred to determine the distance values D for many or all pairs of first and second edge points T(x, y), R(x, y) along the edge courses VT and VR in order to be able to recognize any adhesive tape on the bank note with especially high reliability.

Figure 8:
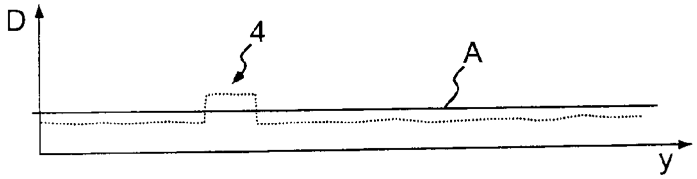
FIG. 8 a first example of the course of distance values ascertained from first and second edge points.

FIG. 8 shows a first example of the course of distance values D ascertained from first and second edge points T(x, y) and R(x, y), along the y direction of the upper edge of the obtained transmission or remission image. Additionally, FIG. 8 shows the distance comparison value A which was ascertained in advance on the basis of bank notes having no adhesive tape or similar foreign objects. The distance comparison value A can be chosen in dependence on the measuring accuracy of the image recording. For example, there can be employed as a distance comparison value A a length of 1, 2 or 3 pixel sizes of the remission or transmission image. As indicated by the figure, the distance values D exceed the distance comparison value A in a region along the y direction, from which one can infer a significant deviation of the edge course VT of the transmission image in comparison to the edge course VR of the remission image, and thus the adhesive tape 4 located on the bank note 3.

Figure 9:
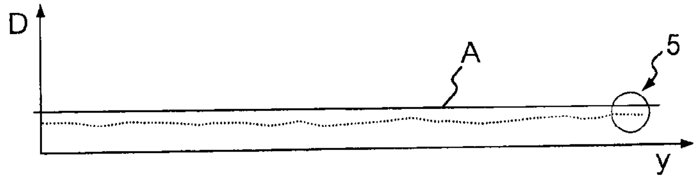
FIG. 9 a second example of the course of distance values ascertained from first and second edge points.

In comparison, FIG. 9 shows a second example of the course of distance values D ascertained from first and second edge points T(x, y) and R(x, y), along the y direction on the lower edge of the edge course VT, VR. Unlike in the region of the adhesive tape 4 located on the bank note 3, the distance values D ascertained in the region of the deformation 5 of the bank note 3 do not exceed the appurtenant distance comparison value A, from which one can infer that no adhesive tape is located at this place on the bank note 3.

Using the hereinabove described method, or using the corresponding apparatus, one can thus distinguish in a simple and reliable manner whether the deviations from the edge course of the bank note that are captured by means of image sensors are caused by deformations, in particular distortions or bulges, of the bank note itself or by any adhesive tape located on the bank note. As a result, this reliably prevents a bank note that has merely such deformations but no adhesive tape from being falsely taken out of circulation and possibly fed to a destruction process.

The invention claimed is:

1. An apparatus for checking value documents comprising:

at least one sensor for capturing an electromagnetic radiation transmitted by a value document and generating corresponding first sensor signals which correspond to the electromagnetic radiation respectively transmitted in the region of the edge of the value document, and for capturing an electromagnetic radiation remitted by the value document and generating corresponding second sensor signals which correspond to the electromagnetic radiation respectively remitted in the region of the edge of the value document, and an evaluation device for checking whether the value document has a foreign object taking into account the first sensor signals and taking into account the second sensor signals;

wherein the at least one sensor is configured for generating a transmission image, composed of first sensor signals, and a remission image composed of second sensor signals, and the evaluation device is configured for ascertaining on the basis of the first sensor signals one or more first edge points which correspond to the edge of the value document:

ascertaining on the basis of the second sensor signals one or more second edge points which correspond to the edge of the value document; and checking whether the value document has a foreign object on a basis of any differences between an edge course of the value document ascertained from the transmission image and an edge course of the value document ascertained from the remission image.

2. The apparatus according to claim 1, wherein the evaluation device is configured such that, upon the check of whether the value document has a foreign object, it compares with each other the first sensor signals which correspond to the electromagnetic radiation respectively transmitted in the region of the edge of the value document, and the second sensor signals which correspond to the electromagnetic radiation respectively remitted in the region of the edge of the value document.

3. The apparatus according to claim 1, wherein the evaluation device is configured for comparing the position of at least one of the first edge points with the position of at least one of the second edge points in order to ascertain a spatial distance between the respective first and the second edge point and/or an area between the first and the second edge points, with the positions of those first and second edge points being compared with each other that are mutually corresponding points along the edge of the value document; and checking on the basis of the spatial distance and/or the area whether a foreign object, is present in the region of the edge of the value document.

4. The apparatus according to claim 3, wherein the evaluation device is configured for comparing the spatial distance with at least one pre-specified distance comparison value, and/or the area with at least one pre-specified area comparison value, and, if the distance exceeds the distance comparison value and/or the area the area comparison value, for affirming the presence of a foreign and otherwise negating the presence of a foreign object.

5. The apparatus according to claim 4, wherein the at least one distance comparison value/area comparison value corresponds to a distance value/area value ascertained on the basis of at least one value document on which no foreign object is located.

6. The apparatus according to claim 3, wherein the evaluation device is configured for ascertaining the position of the at least one first/second edge point by comparing the first/second sensor signals with at least one threshold value.

7. The apparatus according to claim 3, wherein the course of the value-document edge is ascertained in transmission from the first sensor signals by means of edge detection and the positions of a multiplicity of first edge points are ascertained therefrom, and wherein the edge course of the value document is ascertained in remission from the second sensor signals by means of edge detection and the positions of a multiplicity of second edge points therefrom.

8. The apparatus according to claim 3, wherein the evaluation device is configured for ascertaining a distance value for the spatial distance between the respective first edge point and the respective second edge point which corresponds to the respective first edge point along the edge of the value document, said value representing a measure of the spatial distance of the respective first edge point from the respective second edge point.

9. The apparatus according to claim 3, wherein the evaluation device is configured for:

respectively ascertaining a distance value for a plurality of pairs of a first and a second edge point, and checking whether a pre-specified minimum number of pairs of edge points exceeds the distance comparison value; and if the distance value exceeds the distance comparison value for at least a pre- specified minimum number of pairs of edge points, affirming the presence of a foreign object and otherwise negating the presence of a foreign object.

10. The apparatus according to claim 3, wherein the evaluation device is configured for ascertaining a number of distance values that are greater than the distance comparison value, and for carrying out the check of whether the value document has a foreign object on the basis of a comparison of the ascertained number of distance values that are greater than the distance comparison value with a pre-specified minimum number of distance values.

11. The apparatus according to claim 8, wherein the at least one distance value is the Euclidean distance between a first and a second edge point in each case.

12. The apparatus according to claim 1, wherein the at least one sensor is configured for spatially resolved capture of the electromagnetic radiation transmitted by the value document and the electromagnetic radiation remitted by the value document and for generating corresponding first and second sensor signals.

13. A value-document processing system having at least one apparatus for processing, value documents, and having an apparatus for checking value documents according to claim 1.

14. A method for checking value documents, having the following steps:

capturing an electromagnetic radiation transmitted by a value document and generating corresponding first sensor signals;

capturing an electromagnetic radiation remitted by the value document and generating corresponding second sensor signals; and checking whether the value document has a foreign object, taking into account the first and second sensor signals which correspond to the electromagnetic radiation respectively transmitted or remitted in the region of the edge of the value document;

wherein at least one sensor is configured for generating a transmission image, composed of the first sensor signals, and a remission image composed of the second sensor signals, and an evaluation device is configured for ascertaining on the basis of the first sensor signals one or more first edge points which correspond to the edge of the value document;

ascertaining on the basis of the second sensor signals one or more second edge points which correspond to the edge of the value document; and checking whether the value document has a foreign object on a basis of any differences between an edge course of the value document ascertained from the transmission image and an edge course of the value document ascertained from the remission image.

15. An assembly for checking value documents comprising:

at least one sensor for capturing an electromagnetic radiation transmitted by a value document and generating corresponding first sensor signals which correspond to the electromagnetic radiation respectively transmitted in the region of the edge of the value document, and for capturing an electromagnetic radiation remitted by the value document and generating corresponding second sensor signals which correspond to the electromagnetic radiation respectively remitted in the region of the edge of the value document, and an evaluation device for checking whether the value document has a foreign object taking into account the first sensor signals and taking into account the second sensor signals;

wherein the at least one sensor is configured for generating a transmission image, composed of first sensor signals, and a remission image composed of second sensor signals, and the evaluation device is configured for ascertaining on the basis of the first sensor signals one or more first edge points which correspond to the edge of the value document;

ascertaining on the basis of the second sensor signals one or more second edge points which correspond to the edge of the value document; and checking whether the value document has a foreign object on a basis of any differences between an edge course of the value document ascertained from the transmission image and an edge course of the value document ascertained from the remission image.

* * * * *